US011772552B2

United States Patent
Young et al.

(10) Patent No.: US 11,772,552 B2
(45) Date of Patent: Oct. 3, 2023

(54) VEHICLE INTERIOR LIGHTING ASSEMBLY

(71) Applicant: NISSAN NORTH AMERICA, INC., Franklin, TN (US)

(72) Inventors: Steven Young, Ypsilanti, MI (US); Nelson Phan, Rochester Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/537,413

(22) Filed: Nov. 29, 2021

(65) Prior Publication Data
US 2023/0166656 A1 Jun. 1, 2023

(51) Int. Cl.
*B60Q 3/208* (2017.01)
*B60J 7/043* (2006.01)

(52) U.S. Cl.
CPC ............. *B60Q 3/208* (2017.02); *B60J 7/043* (2013.01)

(58) Field of Classification Search
CPC . B60J 7/043; B60J 7/007; B60J 7/0015; B60J 7/0023; B60J 7/003; B60J 7/0038; B60Q 3/00; B60Q 3/203; B60Q 3/20; B60Q 3/208
USPC .................................................. 296/214, 215
See application file for complete search history.

(56) References Cited

U.S. PATENT DOCUMENTS

| 7,967,486 | B2 | 6/2011 | Ludwig et al. |
| 10,272,832 | B2 | 4/2019 | Xu et al. |
| 10,358,084 | B2 | 7/2019 | Salter et al. |
| 10,625,668 | B2 | 4/2020 | Oshina |

FOREIGN PATENT DOCUMENTS

| CN | 108698489 B | * | 10/2021 | ............ B60J 1/2052 |
| DE | 102018123196 A1 | * | 3/2020 | ............ B60J 7/022 |
| DE | 102019131293 A1 | | 5/2021 | |
| KR | 200414173 Y1 | | 4/2006 | |
| KR | 20100020318 A | * | 2/2010 | |
| WO | WO-2017133894 A1 | * | 8/2017 | ............ B60J 1/2052 |

OTHER PUBLICATIONS

Translation of Wenzel et al. (Year: 2017).*

* cited by examiner

*Primary Examiner* — Dennis H Pedder
(74) *Attorney, Agent, or Firm* — Global IP Counselors, LLP

(57) ABSTRACT

A vehicle interior lighting assembly includes a roof structure, a headliner and a light source. The roof structure has a lower surface portion located inboard of the outer periphery. The headliner is supported to the outer periphery of vehicle roof structure. The headliner has a central opening defined by an inner edge portion of the headliner. The opening exposes a portion of the roof structure. The inner edge portion of the headliner is spaced apart from the lower surface portion of the vehicle roof structure such that a gap is defined between the vehicle roof structure and inner edge portion of the headliner. The light source is installed to the lower surface portion of the vehicle roof structure such that when the light source is illuminated, light is emitted through the gap between the vehicle roof structure and inner edge portion of the headliner.

20 Claims, 10 Drawing Sheets

VEHICLE INTERIOR LIGHTING ASSEMBLY

BACKGROUND

Technical Field

The present disclosure generally relates to vehicle interior lighting system. More specifically, the present disclosure relates to a vehicle interior lighting system that provides indirect lighting to a portion of a roof structure of the passenger compartment of the vehicle with light sources installed to opposite lateral sides of the roof structure that are concealed by a headliner configured and shaped such that light from the light source shines through a gap defined between edges of a central opening of the headliner and an adjacent area of the roof structure.

Background Information

Most vehicles are provided with lighting features within the passenger compartment thereof.

SUMMARY

One object of the present disclosure is to provide indirect lighting to a portion of the roof structure within a vehicle where light travels from a light source concealed by a headliner through a gap defined between a headliner and a portion of the roof structure.

In view of the state of the known technology, one aspect of the present disclosure is to provide a vehicle interior lighting assembly with a vehicle body structure, a vehicle roof structure, a headliner and a light source. The vehicle body structure has a plurality of pillar structures. The vehicle roof structure has an outer periphery attached to upper ends of the plurality of pillar structures. The vehicle roof structure has a lower surface portion located inboard of the outer periphery. The headliner is supported to the outer periphery of vehicle roof structure. The headliner has a central opening defined by an inner edge portion of the headliner. The opening exposes a portion of the vehicle roof structure. The inner edge portion of the headliner is spaced apart from the lower surface portion of the vehicle roof structure such that a gap is defined between the vehicle roof structure and inner edge portion of the headliner. The light source is installed to the lower surface portion of the vehicle roof structure such that when the light source is illuminated, light is emitted through the gap between the vehicle roof structure and inner edge portion of the headliner.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
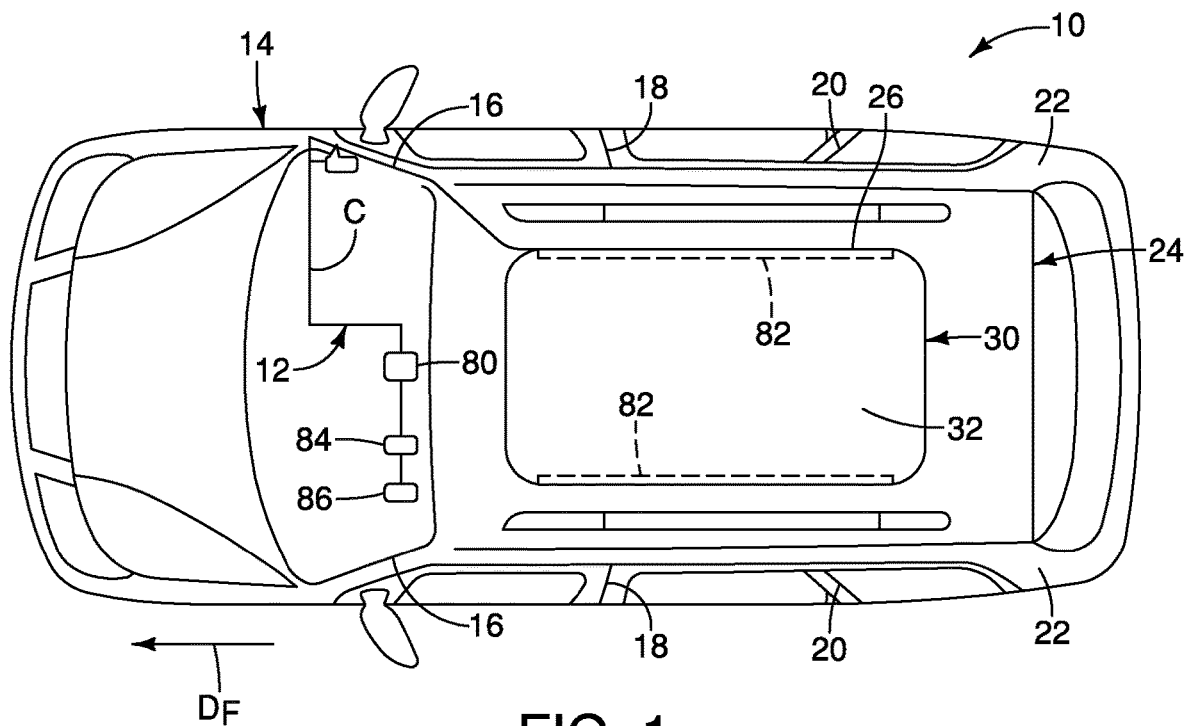
FIG. 1 is a top schematic view of a vehicle that includes an interior lighting assembly that includes light modules installed to the roof structure on opposite lateral sides of a sunroof structure in accordance with a first embodiment.

Referring initially to FIG. 1, a vehicle 10 that includes a vehicle interior lighting assembly 12 is illustrated in accordance with a first embodiment.

As shown in FIG. 1, the vehicle 10 includes a vehicle body structure 14 with a plurality of pillar structures 16, 18, 20 and 22 that support a roof structure 24. The pillars 16 are usually referred to as A-pillars 16, the pillars 18 are usually referred to as B-pillars 18, the pillars 20 are usually referred to as C-pillars 20 and the pillars 22 are usually referred to as D-pillars 22. The roof structure 24 has an outer periphery 26 that is attached to upper ends of the plurality of pillars 16, 18, 20 and 22 in a conventional manner. The vehicle body structure 14 (and the vehicle 10) define a vehicle forward direction DF.

The vehicle roof structure 24 has a sunroof structure 30 fixedly attached to the vehicle roof structure 24 in a conventional manner. The sunroof structure 30 is spaced apart from the outer periphery 26 of the roof structure 24 and is approximately centered relative to the roof structure 24 relative to the lateral sides of the vehicle 10. The sunroof structure 30 has a transparent area 32 (for example, glass or other glass-like material) that is bordered on either lateral side thereof by a pair of rail members 34 that are spaced apart from the outer periphery 26 of the roof structure 24. The transparent area 32 can be movable between a closed orientation (FIGS. 3 and 4) and an open orientation (not shown), or, alternatively, can be fixed in position relative to the roof structure 24.

The sunroof structure 30 is a conventional sunroof structure that is well known in the art. Therefore, other than the description below of the rail members 34, description of the sunroof structures 30 is omitted for the sake of brevity.

The rail members 34 are located on opposite lateral sides of the sunroof structure 30. The rail members 34 are identical mirror images of one another. Since the rail members 34 are basically the same, only one is described herein below for the sake of brevity.

Figure 5:
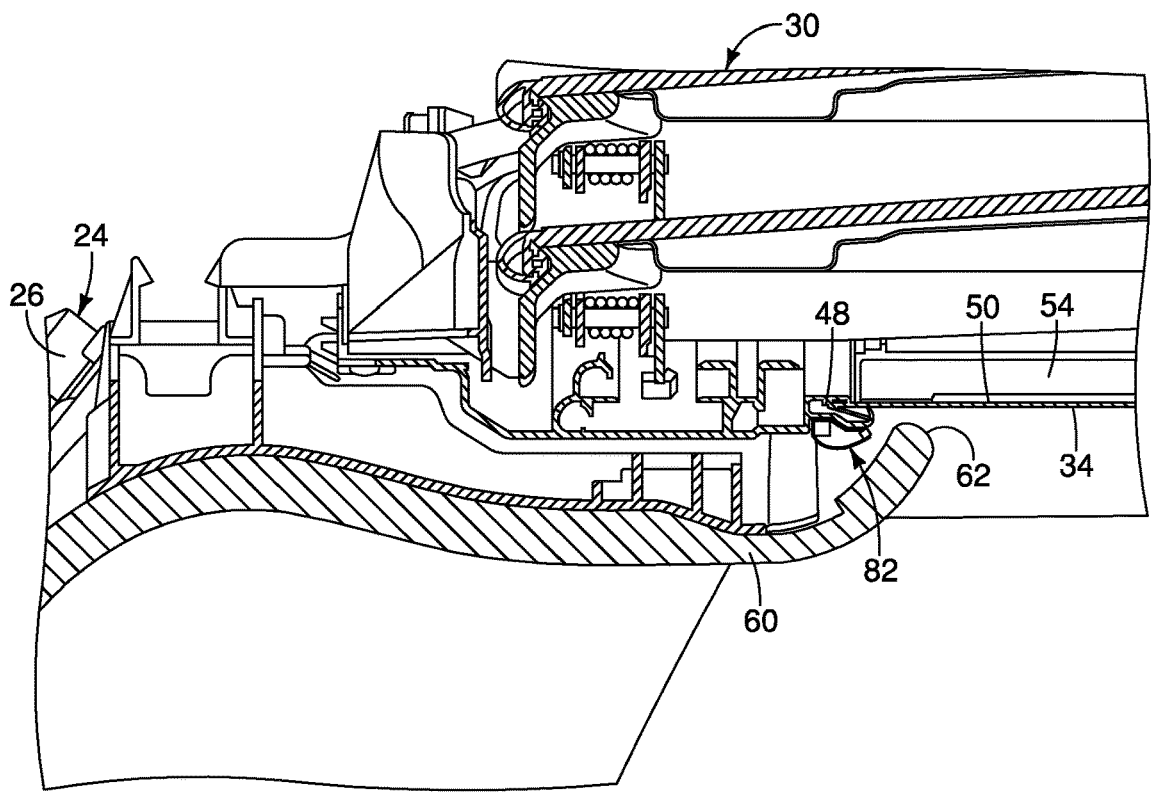
FIG. 5 is a cross-sectional view of portion of one lateral side of the roof structure and the sunroof structure showing one of the rails with one of the light modules installed within a groove of the rail in accordance with the first embodiment.
Figure 6:
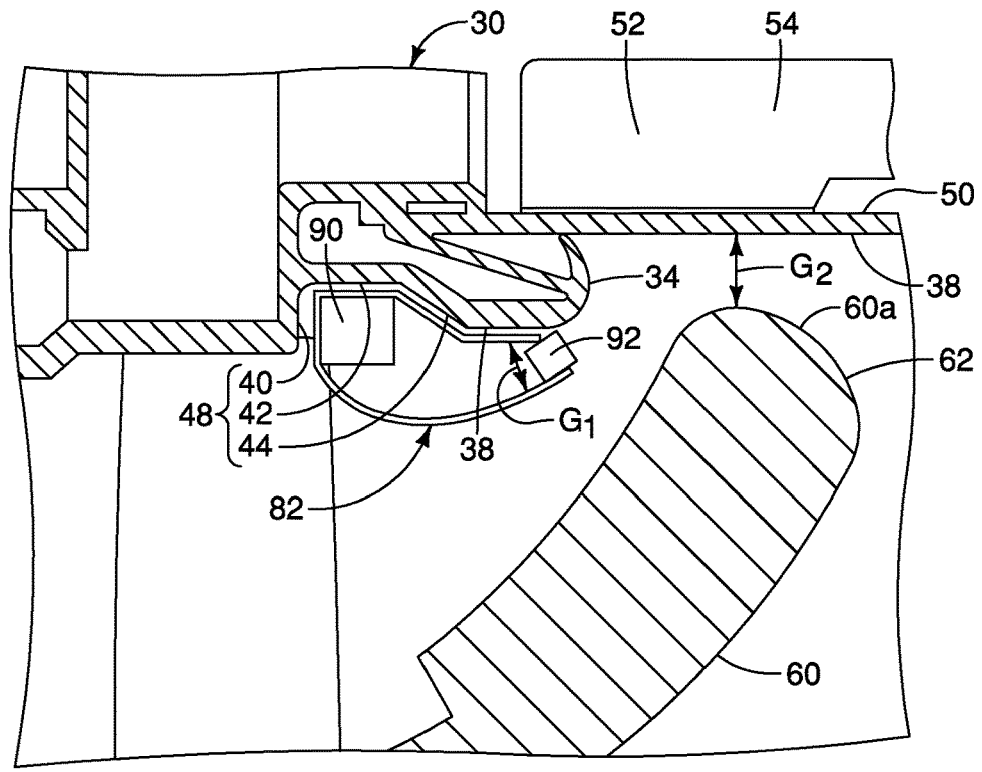
FIG. 6 is an enlarged portion of the cross-sectional view shown in FIG. 5 showing details of the rail member, the headliner and the light module in accordance with the first embodiment.

As shown in FIGS. 5 and 6, the rail member 34 defines a lower surface portion 38 that includes at least two and preferably three non-parallel surfaces 40, 42 and 44 that are adjacent to one another and define a straight elongated groove 48 (hereinafter the groove 48). The rail member 34 also includes an upper surface 50 that defines a track that slidably supports a lateral edge 52 of a screen 54 of the sunroof structure 30. The screen 54 is slidable along the upper surface 50 (the track) between a closed position covering an underside of the transparent area 32 and an open position exposing the transparent area 32.

Figure 3:
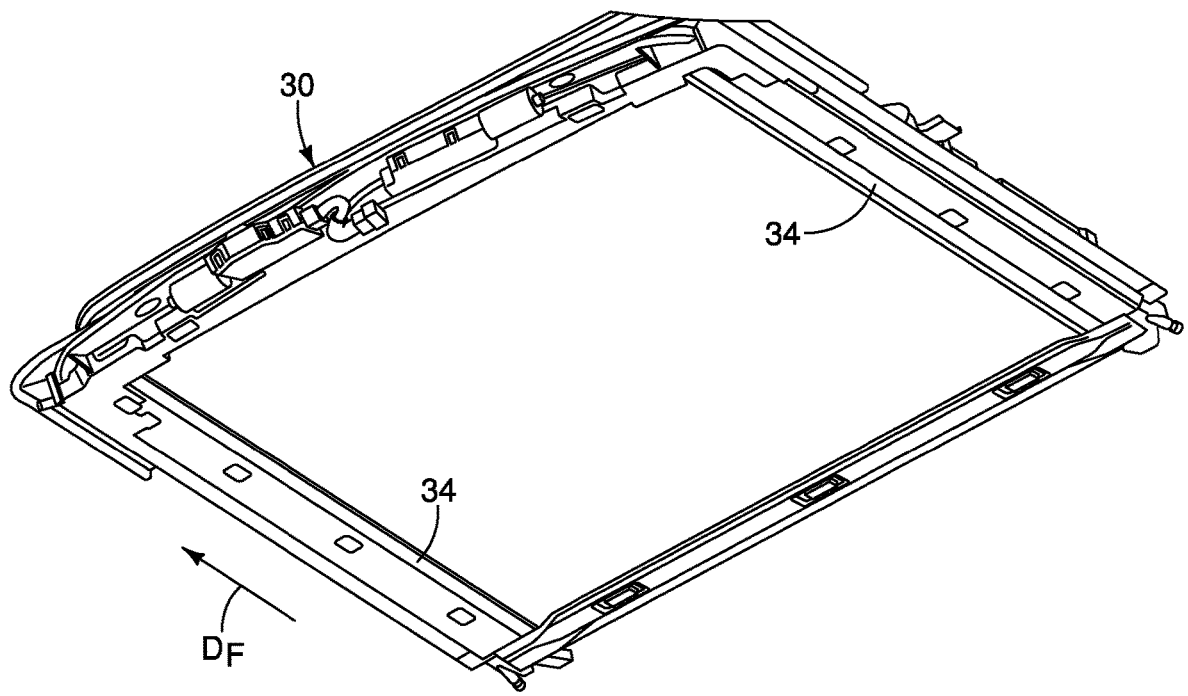
FIG. 3 is a lower perspective view (looking upward) of a portion of the sunroof structure shown removed from the roof structure showing a pair of rail members in accordance with the first embodiment.
Figure 4:
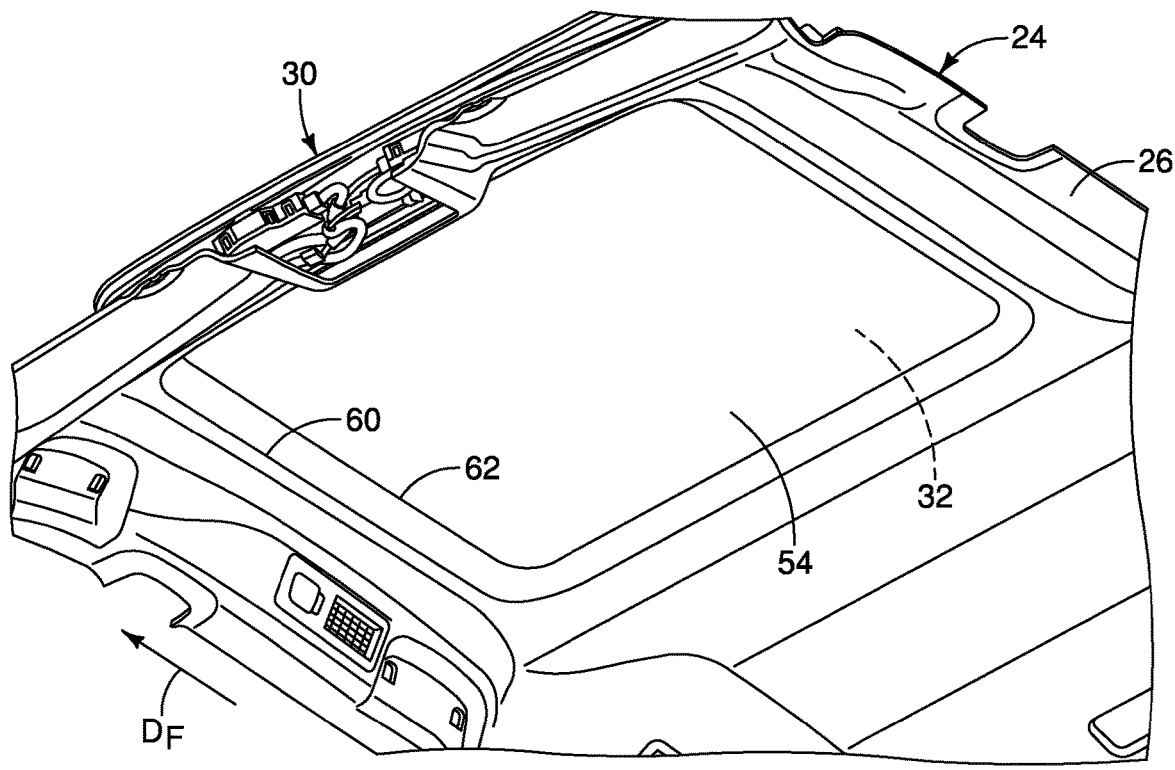
FIG. 4 is another lower perspective view (looking upward) of a portion of the roof structure including the sunroof structure showing a headliner with a central opening, the headliner concealing the rail members of the roof structure in accordance with the first embodiment.

The roof structure 24 further includes a headliner 60 that is supported to the outer periphery 26 of vehicle roof structure 24 in a conventional manner. The headliner 60 has a central opening 62 exposes the screen 54, with the screen 54 in a closed orientation, as shown in FIG. 3. When the screen 54 is in an open orientation (not shown) the transparent area 32 is exposed through the central opening 62. More specifically, both the transparent area 32 and the screen 54 are disposed above the headliner 60, with the screen 54 being beneath the transparent area 32 and above the headliner 60. The transparent area 32 is centered over and is above the central opening 62.

As shown in FIGS. 5 and 6 in cross-section, an inner edge portion 60a of the headliner 60 defines the central opening 62. The inner edge portion 60a curves upward toward a lower surface of the rail member 34. The inner edge portion 60a of the headliner 60 is spaced apart from the lower surface portion 38 of the sunroof structure 30.

Figure 2:
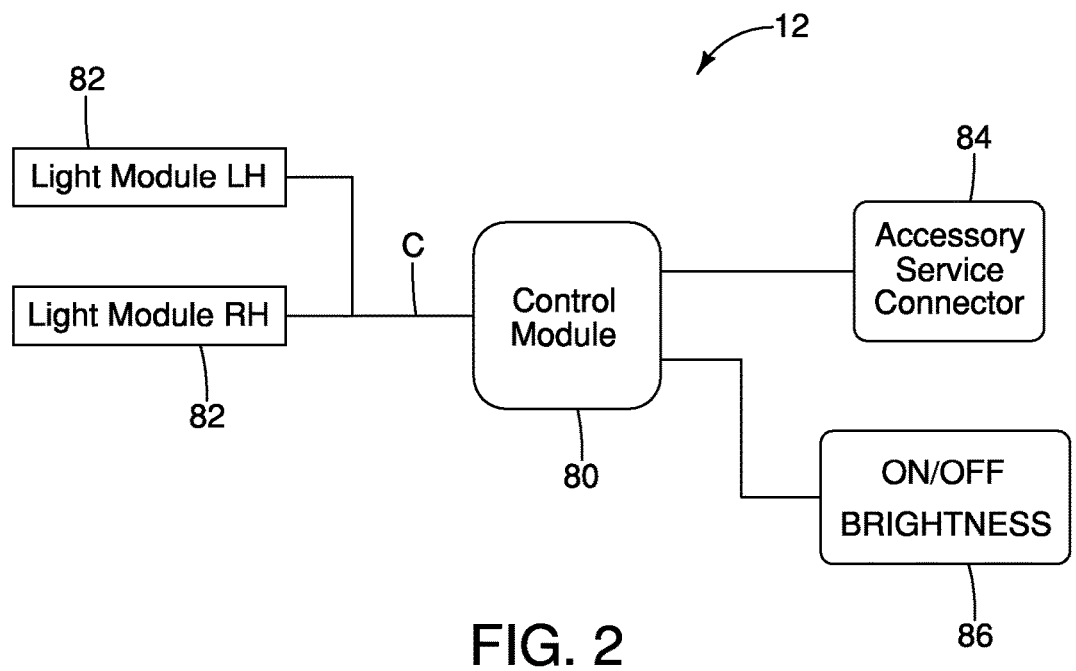
FIG. 2 is a block diagram of the interior lighting assembly showing a control module, a pair of the light modules, an accessory service connector and a switch mechanism in accordance with the first embodiment.

A description of the interior lighting assembly 12 is now provided with initial reference to FIG. 2, and further reference to FIGS. 5-11.

As shown in FIG. 2, the interior lighting assembly 12 basically includes a control module 80, light modules 82, an accessory service connector 84, a switch mechanism 86 and electrical cables C. The interior lighting assembly 12 can be a stand-alone assembly or kit that can be installed as an after-market accessory to a vehicle, or can be installed to the vehicle 10 during the manufacturing process of the vehicle 10.

The control module 80 can include programming for operation of the lighting modules 82 such that the operation of the light modules 82 compliments other interior lighting elements within the vehicle 10. For instance, the control module 80 can be programed to turn on the light modules 82 (illuminate the light modules 82) when, for example, other interior lights are operated, when a passenger or vehicle operator enters the vehicle, or when the engine is turned off. Still further, the control module 80 can operate the lighting modules 82 when the switch mechanism 86 is operated to turn the light modules 82 on. Also, the switch mechanism 86 can include light brightness and/or dimming capabilities and can disengage operation of the light modules 82 from the above mentioned operation of the other interior lighting elements.

The accessory service connector 84 is dimensioned and configured to connect to an existing wiring harness connector (not shown) within the vehicle 10. The control module 80 can be installed behind an instrument cluster in the dashboard of the vehicle 10 or other convenient location. The cable C can be installed in one of the A-pillars 16 such that it extends from the control module 80 to each of the light modules 82.

A description of the light modules 82 is now provided with specific reference to FIGS. 1 and 5-11. There are two modules 82, each of the two modules 82 being an elongated assembly, with one module 82 installed to a driver's side of the sunroof structure 30 and the other module 82 installed to the passenger's side of the sunroof structure 30. More specifically, the modules 82 are installed to a corresponding one of the rail members 34 along opposite laterals sides of the sunroof structure 30, as shown in schematically in FIGS. 1 and 7. Hence, each module 82 is straight for installation to the rail members 34, which are also straight and parallel to one another. The light modules 82 are identical to one another. Therefore, description of only one light module 82 is provided below for the sake of brevity.

As shown in FIGS. 5-6 and 9-11, the light module 82 include a housing member 88, a light source 90 and a diffuser/filter 92.

Figure 9:
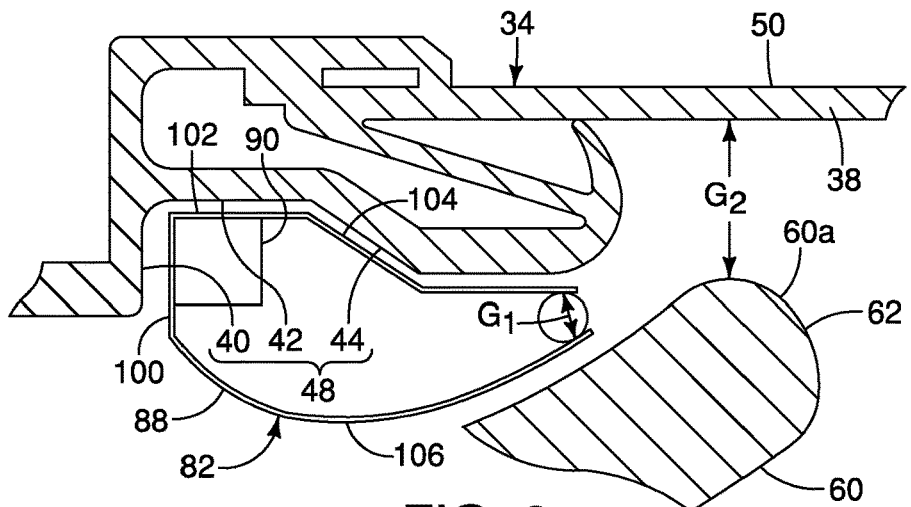
FIG. 9 is another cross-sectional view similar to FIG. 6 showing a lower surface portion of one of the rail members of the sunroof structure with the light module installed within a groove defined along the lower surface portion of the rail member in accordance with the first embodiment.
Figure 10:
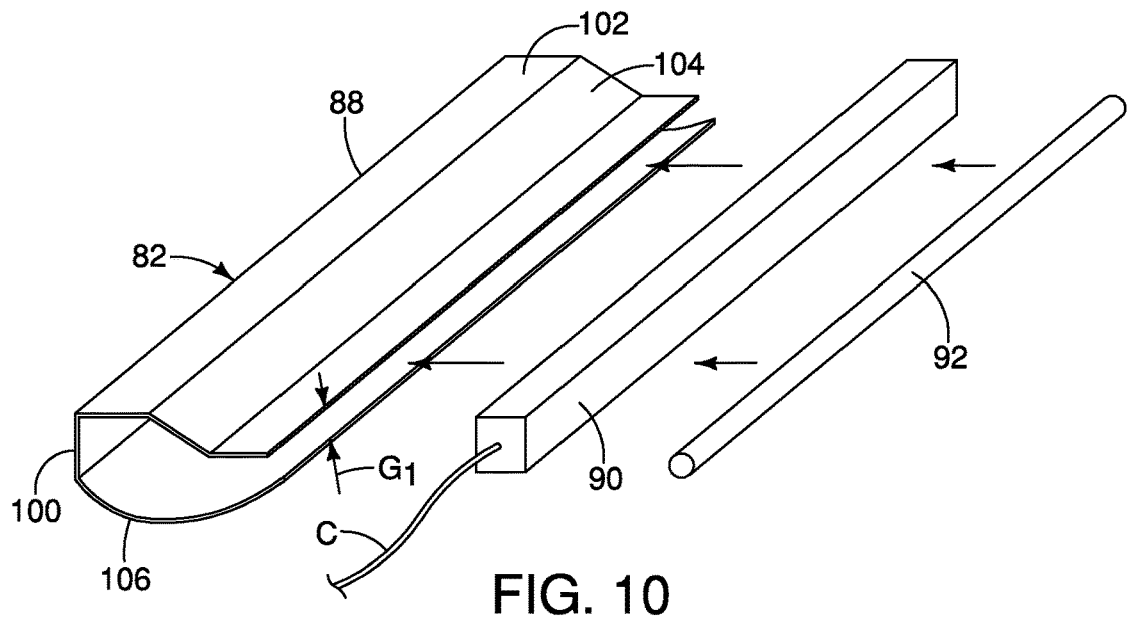
FIG. 10 is an exploded perspective view showing elements of the light module including a hollow housing, a light source and a diffuser/filter in accordance with the first embodiment.
Figure 11:
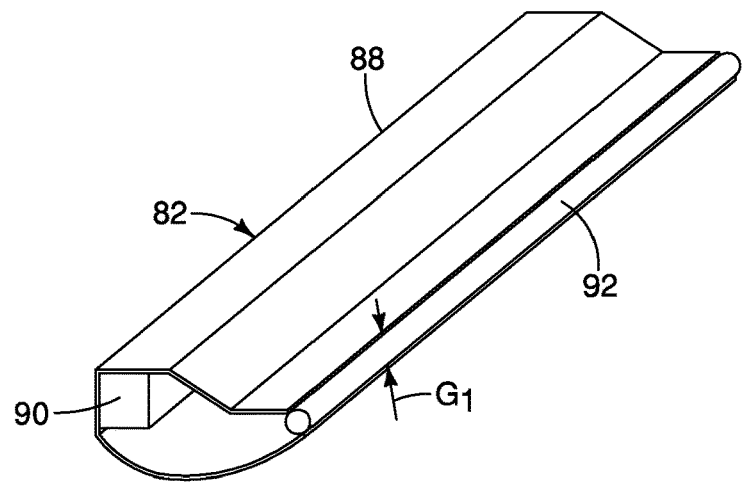
FIG. 11 is a perspective view showing the light module fully assembled with the light source installed within the hollow interior of the housing and the diffuser/filter installed within an inboard facing gap of the housing in accordance with the first embodiment.
Figure 12:
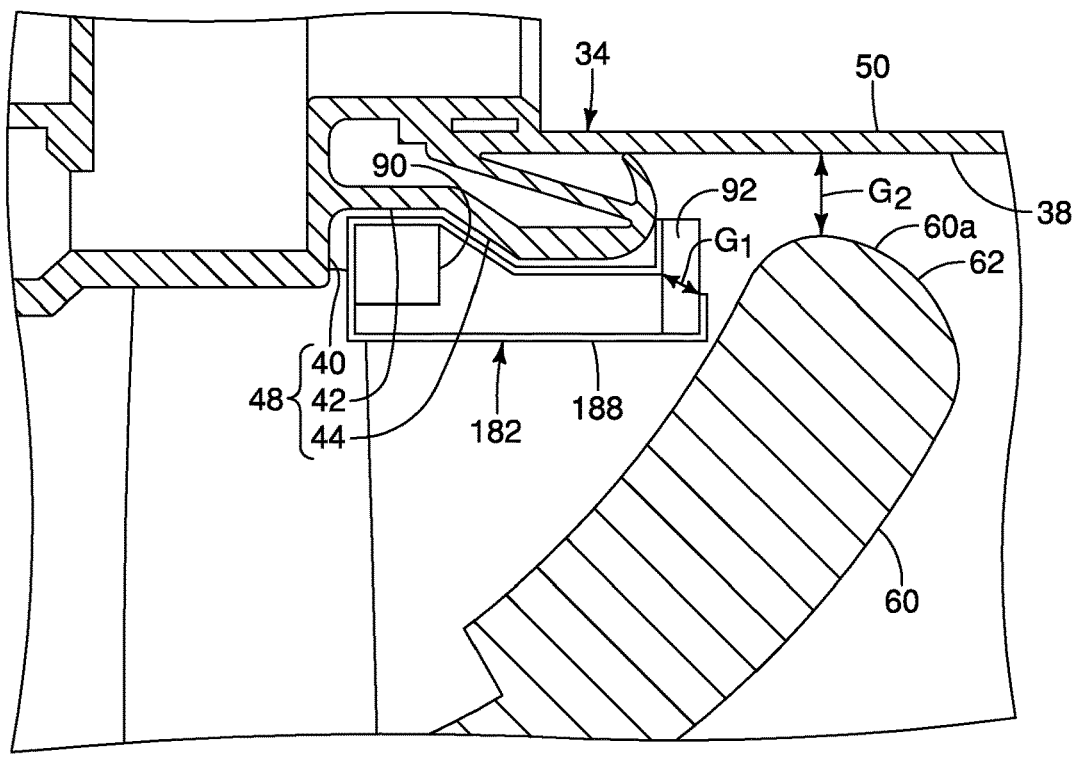
FIG. 12 is a cross-sectional view similar to FIG. 6 showing the lower surface portion the rail member of the sunroof structure with a light module installed within the groove defined along the lower surface portion of the rail member in accordance with a second embodiment.
Figure 13:
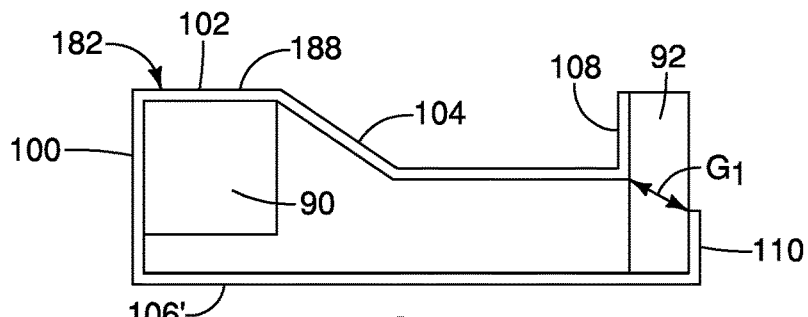
FIG. 13 is a front end view of the light module showing the light source installed within the hollow interior of a housing of the light module and the diffuser/filter installed within a gap defined along an inboard side of the housing in accordance with the second embodiment.
Figure 14:
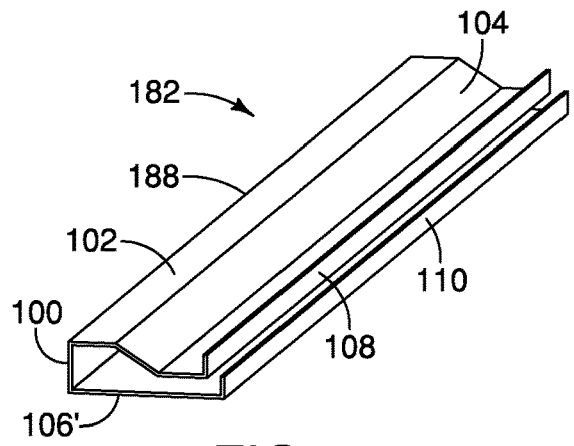
FIG. 14 is a perspective view showing housing of the light module with the light source and the diffuser/filter removed therefrom in accordance with the second embodiment.
Figure 15:
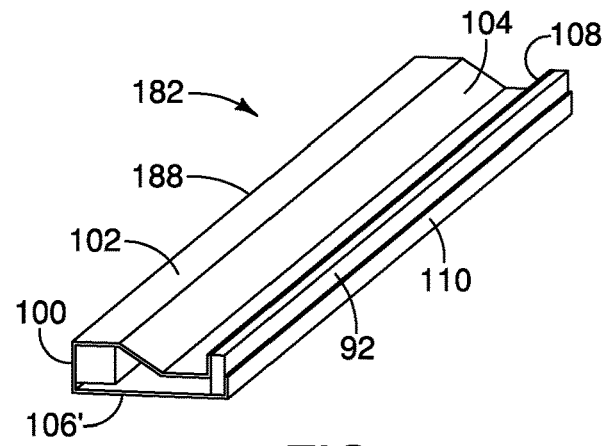
FIG. 15 is a perspective view showing the light module fully assembled with the light source installed within the hollow interior of the housing and the diffuser/filter installed within an inboard facing gap of the housing in accordance with the second embodiment.

As shown in FIGS. 9-11, the housing member 88 (herein after the housing 88) is a hollow elongated construct with an elongated opening that defines a gap $G_1$ along an inboard side thereof. The housing 88 can be a molded elongated element with open ends or closed ends (not shown). More specifically, the housing 88 includes at least two and preferably three non-parallel surface such as a first surface 100, a second surface 102, a third surface 104 and a fourth surface 106 that at least partially surround a hollow interior of the housing 88. The first surface 100 and the second surface 102 intersect one another and are perpendicular to one another. The third surface 104 intersects the second surface 102 and defines an obtuse angle relative to the second surface 102. The first, second and third surfaces 100, 102 and 104 extend the entire length of the housing 88, as shown in FIGS. 10 and 11. The first, second and third surfaces 100, 102 and 104 are dimensioned and oriented to contact respective ones of the surfaces 40, 42 and 44 of the groove 48 of the lower surface portion 38 of the rail member 34, as shown in FIG. 9. The fourth surface 106 is a lower surface of the housing 88 and has a curved contour extending inboard from a lower end of the first surface 100.

The housing 88 is fixed within the groove 48 via an adhesive material or double sided adhesive tape. The housing 88 is a flexible but generally straight member that extends along the groove 48 of the lower surface portion 38 of the rail member 34 when installed thereto.

The housing 88 is made of an opaque material such that light from the light source 90 does not pass through the housing member 88. Rather, light from the light source 90 is only able to escape the hollow interior of the of the housing 88 by passing through the gap $G_1$, as is described further below. The light source 90 can be a strip LEDs (light emitting diodes) encased within a transparent plastic cover or can be flexible ribbon of LEDs in a protective transparent elongated sleeve. The light source 90 can also be light providing devices other than LEDs. The light source 90 can be provided with power from the electrical system of the vehicle 10, or can be provided with electric power from solar panels (not shown) installed on appropriate areas of the roof structure 24.

The inboard ends of the third surface 104 and fourth surface 106 are spaced apart from one another defining the gap $G_1$ and extends the entire length of the housing 88.

The housing 88 defines a light source receiving structure. Specifically, the housing 88 is made of a flexible and resilient material such that the gap $G_1$ can be temporarily widened such that the light source 90 can be inserted into the hollow interior of the housing 88. Once inserted into the hollow interior the light source 90 is adhered to at least the interior surface of the housing 88 opposite the second surface 102. Optionally, the light source 90 can also be adhered to the interior surface opposite the first surface 100 as well. The light source 90 can be adhered to the interior surfaces of the housing 88 by an adhesive applied to corresponding surfaces of the light source 90, or, can be adhered via double sided tape.

After installation of the light source 90 into the housing 88, the diffuser/filter 92 is installed within the gap $G_1$. Specifically, the diffuser/filter 92 is adhered at the inboard end of the third surface 104 and the inboard end of the fourth surface 106. The diffuser/filter 92 is held in position by an adhesive material.

The diffuser/filter 92 is made of an elongated, flexible, transparent or semi-transparent material that has light scattering properties such that light from the light source 90 is scattered or diffused as it leaves the housing 88. The diffuser/filter 92 can be provided with any of a variety of shapes. For example, the diffuser/filter 92 can be in the form of an elongated rope-like member with a round cross-section or a rectangular cross-section. For purposes of understanding the present invention, the actual cross-sectional shape of the diffuser/filter 92 can have any appropriate shape.

The inner edge portion 60a of the headliner 60 is spaced apart from the lower surface portion 38 of the sunroof structure 30 such that a gap $G_2$ is defined between the sunroof structure 24 and inner edge portion 60a of the headliner 60. Hence, light from the housing 88 and the diffuser/filter 92 passes through the gap $G_2$ (between the sunroof structure 30 and inner edge portion 60a of the headliner 60.

Figure 7:
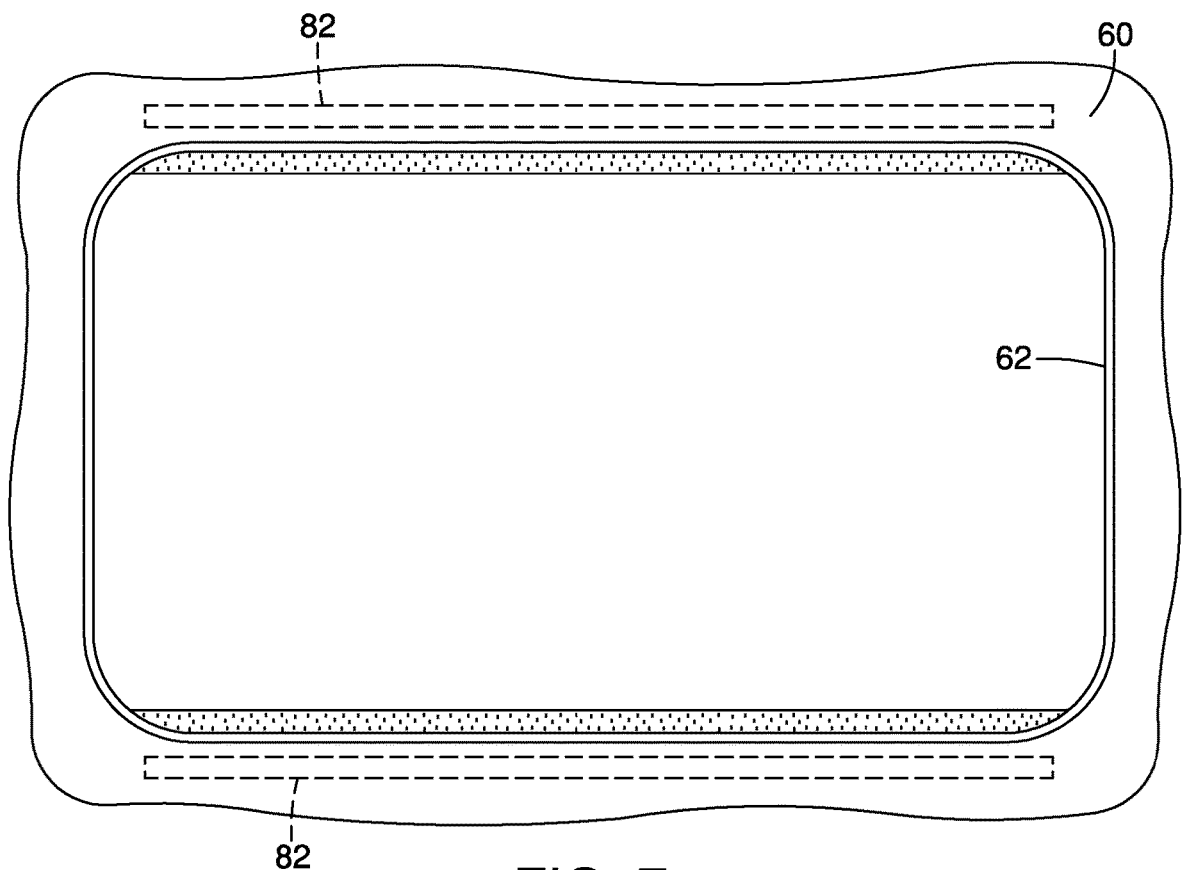
FIG. 7 is a bottom view (looking upward) of the sunroof structure and the headliner showing the light modules in phantom along the lateral sides of the sunroof structure in accordance with the first embodiment.
Figure 8:
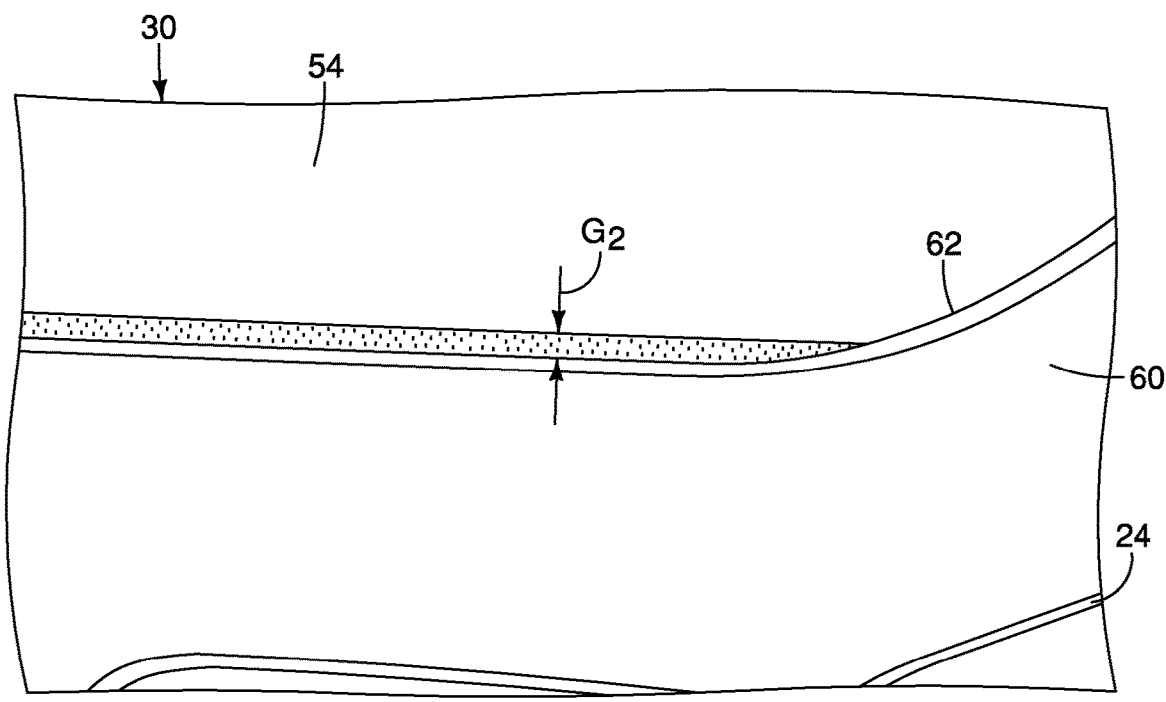
FIG. 8 is a perspective view of the sunroof structure and the headliner showing light (stipple) from one of the light modules passing through a gap between the headliner and a portion of the sunroof structure illuminating one the lateral side of the sunroof structure above the headliner in accordance with the first embodiment.

As shown in FIGS. 7 and 8, the light emitted from the light modules 82 provides indirect lighting along the lateral sides of the sunroof structure 30 and along the lateral sides of the headliner 60. The stipple in FIGS. 7 and 8 represents the scattered light emitted from the light modules 82 which is diffused and scattered by the diffuser/filter 92 of each of the light modules 82. Thus, such illumination within the passenger compartment of the vehicle provides a soft lighting effect that will have little or no impact on a vehicle operators vision during night driving.

Second Embodiment

Referring now to FIGS. 12-15, a light module 182 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the light module 82 of the first embodiment has been replaced with the light module 182. The light module 182 includes a housing 188, the light source 90 and the diffuser/filter 92. The housing 188 includes some of the features of the housing 88 of the first embodiment. Specifically, the housing 188 includes the first surface 100, the second surface 102 and the third surface 104 that fit within the groove 48.

The first surface 100 contacts and can optionally be adhered to the surface 40 of the lower surface portion 38 of the rail member 34, the second surface 102 contacts and is adhered to the surface 42 of the lower surface portion 38 of the rail member 34 and the third surface 104 contacts the surface 44 of the lower surface portion 38 of the rail member 34.

However, the housing 188 has a generally flat lower surface 106' that extends inboard from the surface 100. The housing 188 further includes upright wall 108 and upright wall 110. The upright wall 108 extends upward from the inboard end of the third surface 104 and the upright wall 110 extends upward from the lower surface 106'. The gap $G_1$ is defined between the upright wall 108 and the upright wall 110. The diffuser/filter 92 is installed between the upright wall 108 and the upright wall 110. The light source 90 is installed within the housing 188 to the surface opposite the first surface 100 and the surface opposite the second surface 102 by an adhesive.

Third Embodiment

Figure 16:
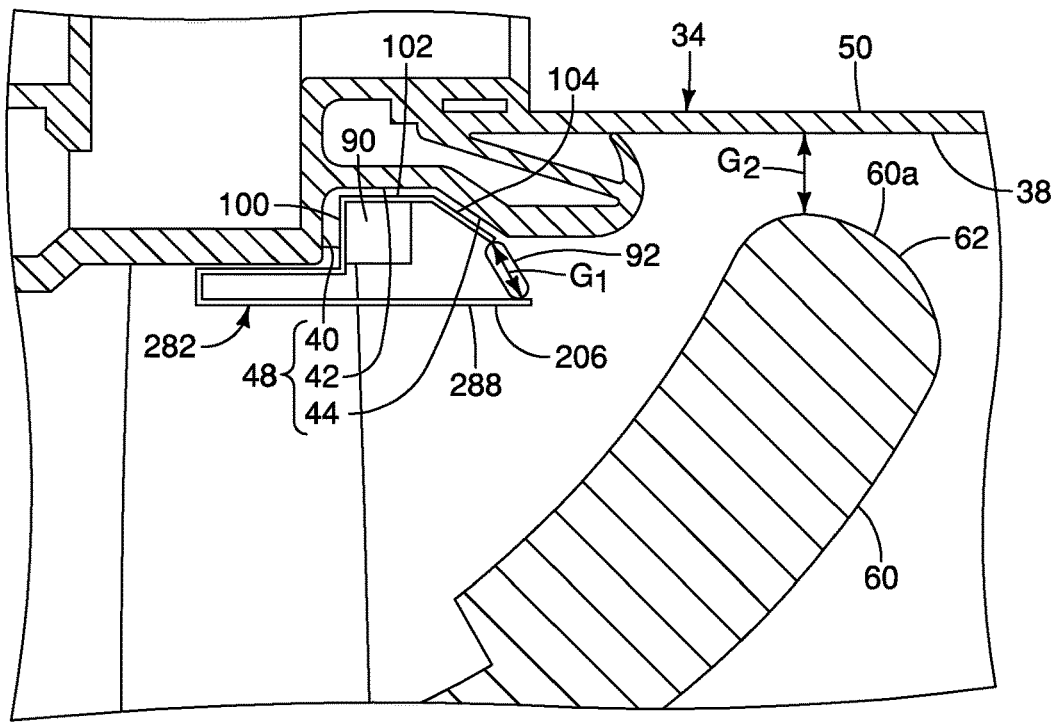
FIG. 16 is a cross-sectional view showing the lower surface portion of one of the rail members of the sunroof structure with a light module installed within a groove defined along the lower surface portion of the rail member in accordance with a third embodiment.
Figure 17:
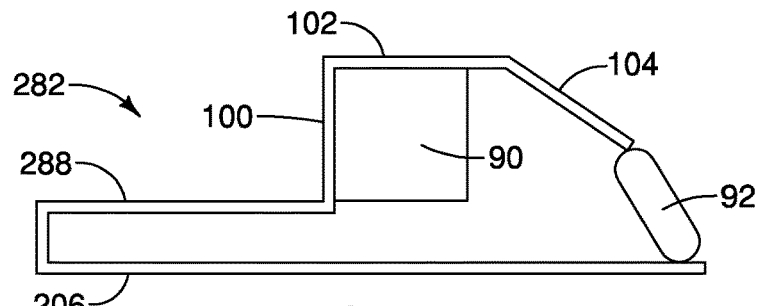
FIG. 17 is a front end view of the light module showing the light source installed within the hollow interior of a housing of the light module and the diffuser/filter installed within a gap defined along an inboard side of the housing in accordance with the third embodiment.
Figure 18:
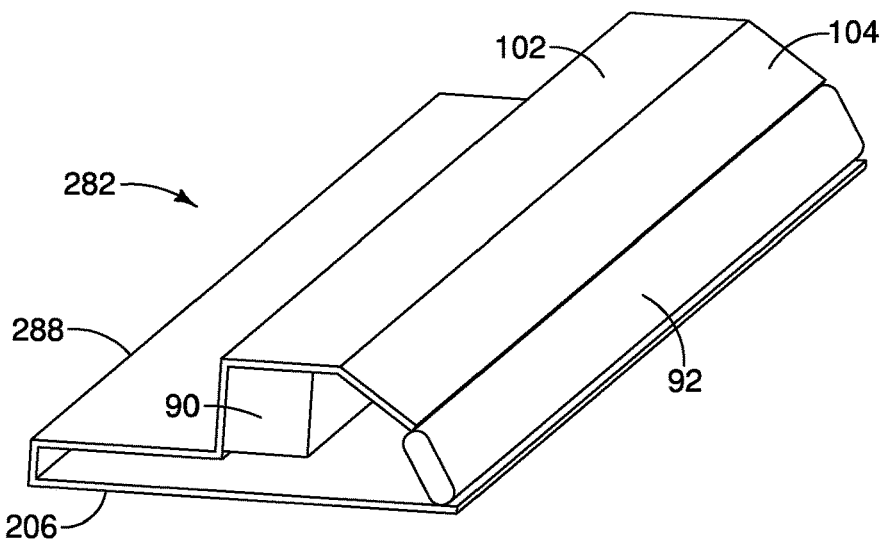
FIG. 18 is a perspective view showing the light module fully assembled with the light source installed within the hollow interior of the housing and the diffuser/filter installed within an inboard facing gap of the housing in accordance with the third embodiment.
Figure 19:
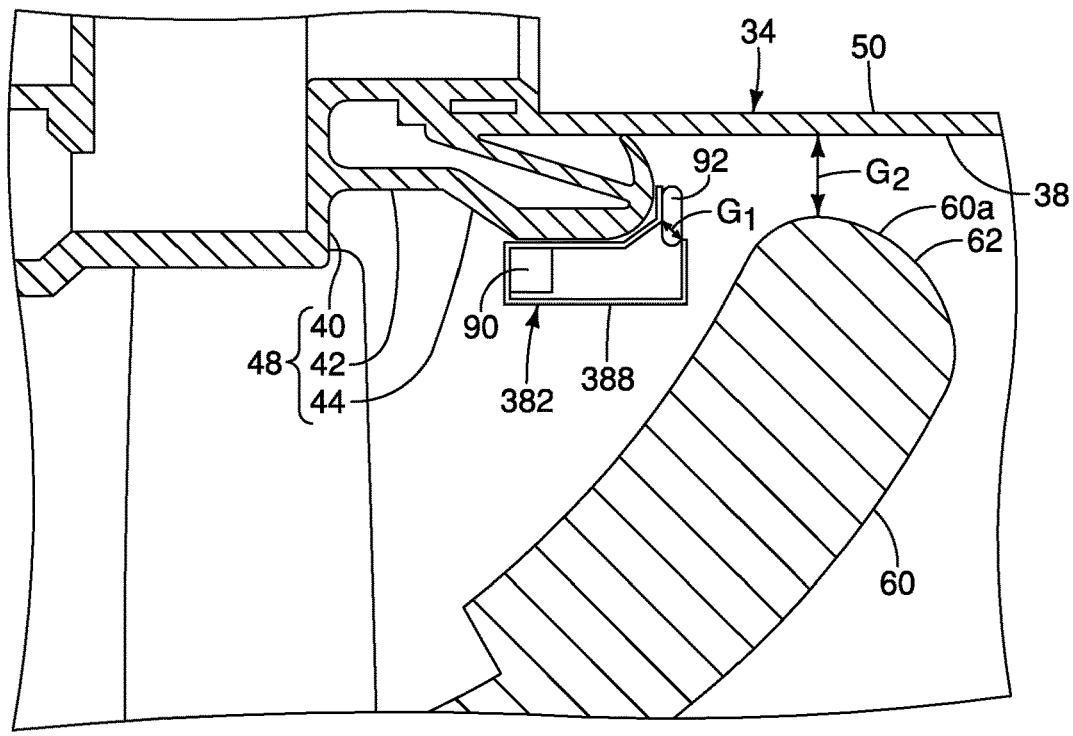
FIG. 19 is a cross-sectional view similar to FIG. 6 showing the lower surface portion the rail member of the sunroof structure with a light module installed within the groove defined along the lower surface portion of the rail member in accordance with a fourth embodiment.
Figure 20:
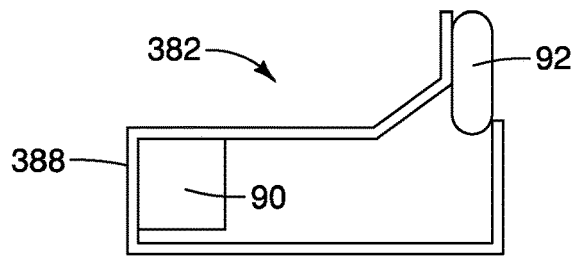
FIG. 20 is a front end view of the light module showing the light source installed within the hollow interior of a housing of the light module and the diffuser/filter installed within a gap defined along an inboard side of the housing in accordance with the fourth embodiment.
Figures 21, 22:
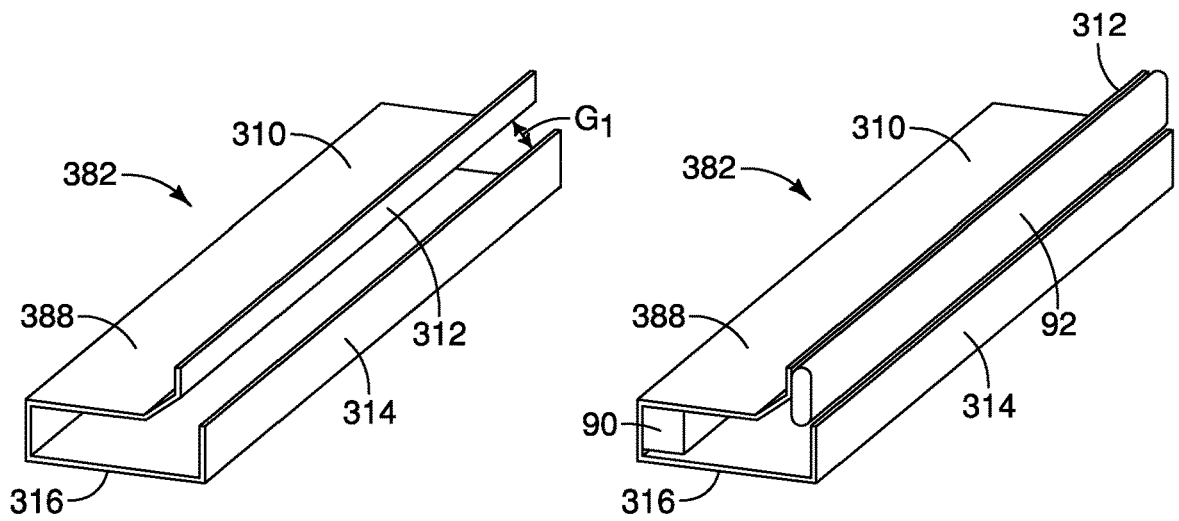
FIG. 21 is a perspective view showing housing of the light module with the light source and the diffuser/filter removed therefrom in accordance with the fourth embodiment.
FIG. 22 is a perspective view showing the light module fully assembled with the light source installed within the hollow interior of the housing and the diffuser/filter installed within an inboard facing gap of the housing in accordance with the fourth embodiment.

Referring now to FIGS. 16-18, a light module 282 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the light module 82 of the first embodiment has been replaced with the light module 282. The light module 282 includes a housing 288, the light source 90 and the diffuser/filter 92. The housing 288 includes some of the features of the housing 88 of the first embodiment. Specifically, the housing 288 includes the first surface 100, the second surface 102 and the third surface 104 that fit within the groove 48 of the lower surface portion 38 of the rail member 34.

The first surface 100 contacts and can optionally be adhered to the surface 40 of the lower surface portion 38 of the rail member 34, the second surface 102 contacts and is adhered to the surface 42 of the lower surface portion 38 of the rail member 34 and the third surface 104 contacts the surface 44 of the lower surface portion 38 of the rail member 34 and can optionally be adhered thereto.

However, the housing 288 has a generally flat lower surface 206 that extends inboard from the gap $G_1$. The housing 288 further includes upright wall that extends upward from the inboard end of the lower surface 206. The gap $G_1$ is defined between the upright wall 108 and the upright wall 110. The diffuser/filter 92 is installed between the surface 104 and the outboard end of the lower surface 206. The light source 90 is installed within the housing 288 to the surface opposite the first surface 100 and the surface opposite the second surface 102 by an adhesive.

Fourth Embodiment

Referring now to FIGS. 19-22, a light module 382 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The light module 382 of the fourth embodiment replaces the light module 82 of the first embodiment. The light module 382 includes a housing 388, the light source 90 and the diffuser/filter 92. The housing 388 includes an upper surface 310, an upwardly extending wall 312 that extends upward from the upper surface 310, an upwardly extending wall 314 that extends from a lower surface 316. The upper surface 310, the upwardly extending wall 312, the upwardly extending wall 314 and the lower surface 316 together define the light source receiving structure that receives the light source 90 and the diffuser/filter 92.

The upper surface 310 of the housing 388 is attached to the surface 44 of the lower surface portion 38 of the rail member 34. Light from the light source 90 passes through the diffuser/filter 92 installed within the gap $G_1$ and thereafter through the gap $G_2$ thereby illuminating a portion of the sunroof structure 30 adjacent to the headliner 60.

Fifth Embodiment

Figure 23:
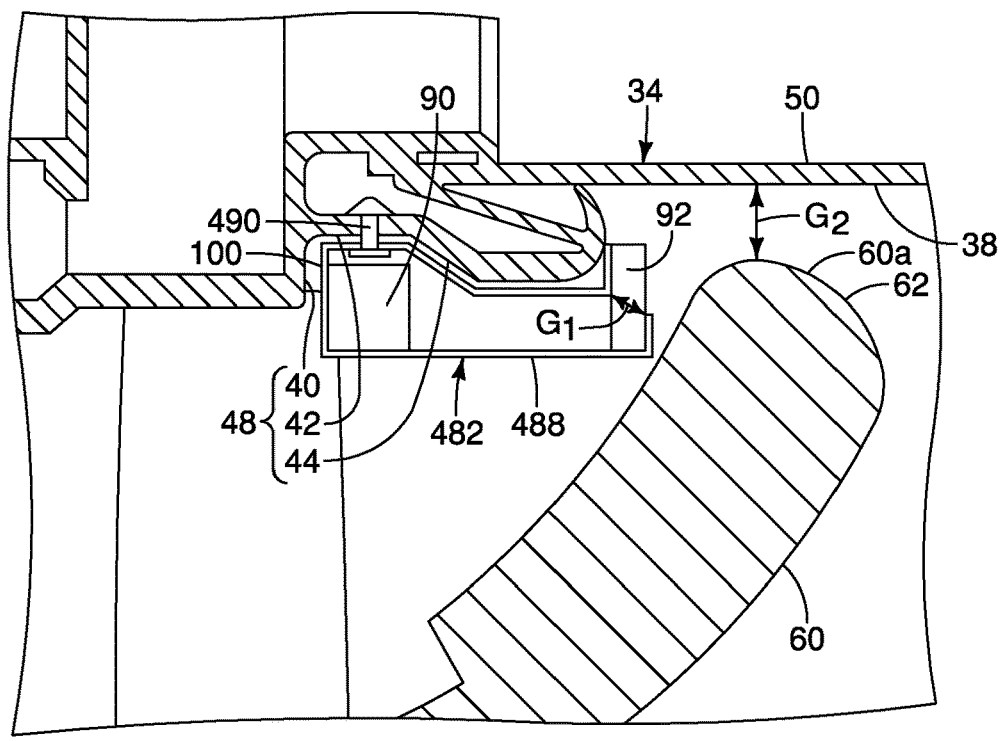
FIG. 23 is a cross-sectional view similar to FIG. 6 showing the lower surface portion the rail member of the sunroof structure with a light module installed within the groove defined along the lower surface portion of the rail member and fixed in place by a snap-fitting clip or fastener in accordance with a fifth embodiment.

Referring now to FIG. 23, a light module 482 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the light module 482 replaces the light module 82 of the first embodiment. The housing 488 of the light module 482 is identical to the housing 188 of the second embodiment except that a snap fitting clip 490 extends through an opening in an upper surface of the housing 488 and is inserted into an opening in the lower surface portion 38 within the groove 48, thereby fixedly attaching the light module 482 to the rail 34.

Sixth Embodiment

Figure 24:
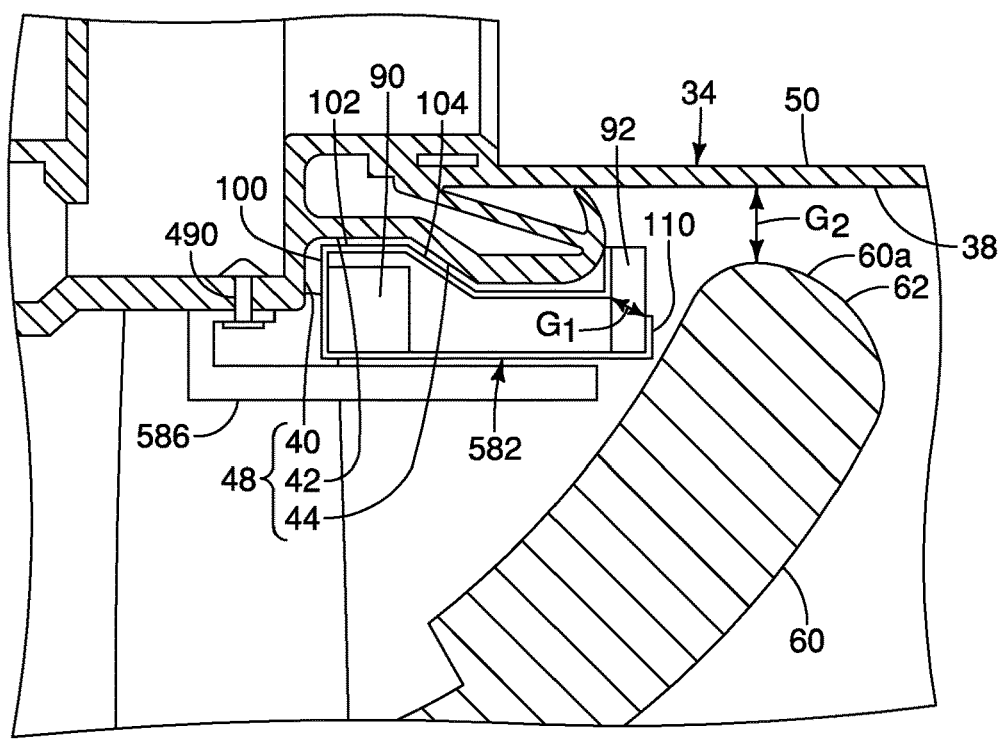
FIG. 24 is a cross-sectional view similar to FIG. 6 showing the lower surface portion the rail member of the sunroof structure with a light module installed within the groove defined along the lower surface portion of the rail member and fixed in place by a plurality of brackets (only one shown) with a snap-fitting clip installed to an outboard side of the bracket that further extends through an opening in the rail member in accordance with a sixth embodiment.

Referring now to FIG. 24, a light module 582 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the light module 582 replaces the light module 82 of the first embodiment. The housing 588 of the light module 482 is identical to the housing 188 of the second embodiment except that a plurality of elongated clips 586 (only one is shown), each elongated clip 596 having a snap fitting clip 490 extends through an opening in the clip 596 and is inserted into an opening in the lower surface portion 38 adjacent to the groove 48, thereby fixedly attaching the light module 582 within the groove 48 of the rail 34.

Seventh Embodiment

Figure 25:
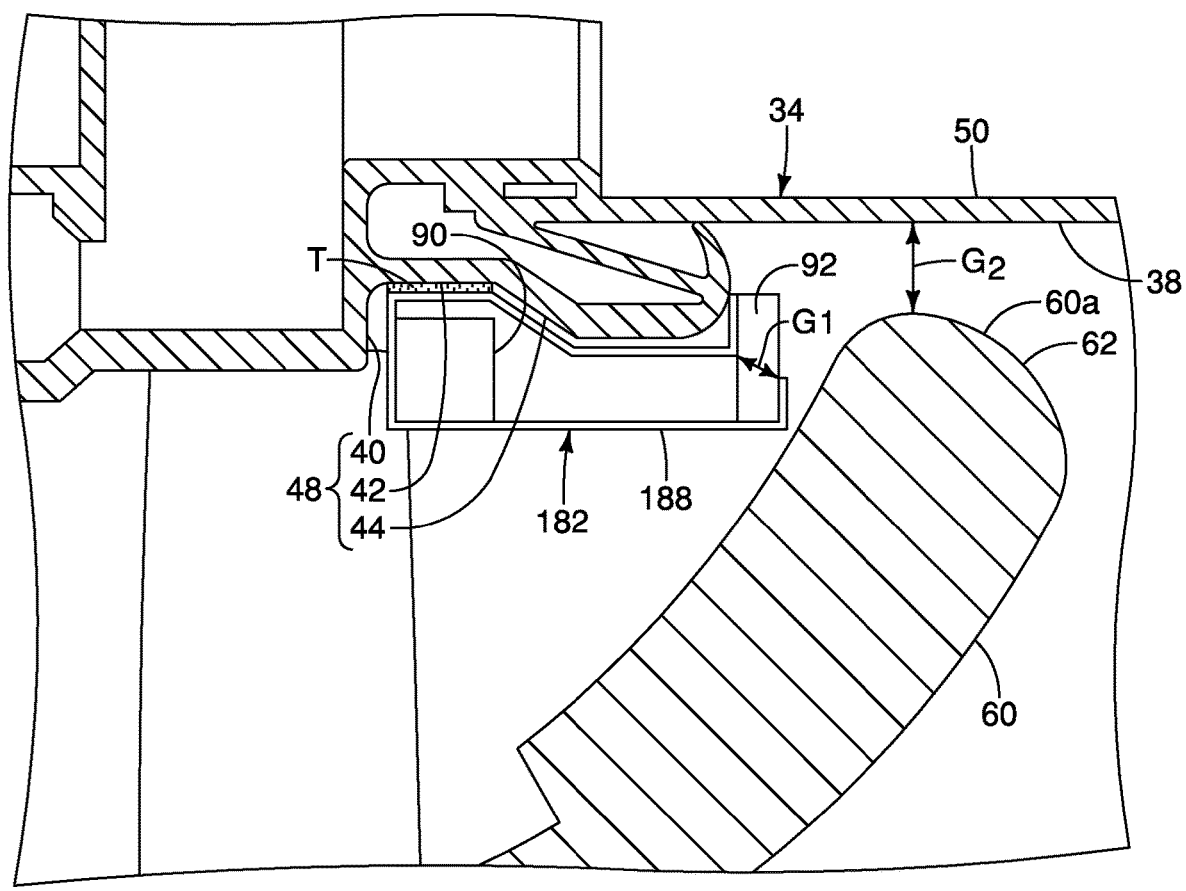
FIG. 25 is a cross-sectional view similar to FIG. 6 showing the lower surface portion the rail member of the sunroof structure with a light module installed within the groove defined along the lower surface portion of the rail member and fixed in place by a double sided adhesive tape in accordance with a seventh embodiment.

Referring now to FIG. 25, the light module 182 from the second embodiment is shown in accordance with a seventh embodiment and will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the light module 182 replaces the light module 82 of the first embodiment. The light module 182 is fixed in position within the groove 48 by double sided tape T that has adhesive on all sides thereof. In the depicted seventh embodiment, the tape T is installed to the upper surface of the housing 188 and adheres to the surface 42 of the groove 48. The tape T can alternatively have a larger profile such that the tape T is also adhered to the surfaces 40 and 44 thereby fixing the light module 182 to the lower surface portion 38 of the rail member 34.

The control module 80 is an electronic controller that preferably includes a microcomputer with a light source operating control program that controls the light source 90. The control module 80 can also include other conventional components such as an input interface circuit, an output interface circuit, and storage devices such as a ROM (Read Only Memory) device and a RAM (Random Access Memory) device. The control module 80 is operatively coupled to an electronic controller (not shown) of the vehicle 10, and to the light modules 82 in a conventional manner.

The vehicle 10 includes many structural and functional elements, devices and components that are conventional components well known in the art. Since these structural, functional elements, devices and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle interior lighting assembly 12. Accordingly, these terms, as utilized to describe the present invention should be interpreted relative to a vehicle equipped with the vehicle interior lighting assembly 12.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle interior lighting assembly, comprising:
   a vehicle body structure having a plurality of pillar structures;
   a vehicle roof structure having an outer periphery attached to upper ends of the plurality of pillar structures, the vehicle roof structure having a rail member that includes a lower surface portion located inboard of the outer periphery;
   a headliner supported to the outer periphery of vehicle roof structure, the headliner having a central opening defined by an inner edge portion of the headliner, the opening exposing a portion of the vehicle roof structure, the inner edge portion of the headliner being spaced apart from the lower surface portion of the rail member such that a main gap is defined between the lower surface portion of the rail member and inner edge portion of the headliner;
   a carrier attached to the rail member outboard of the lower surface portion, the carrier defining a carrier gap between inboard ends of surfaces of the carrier, a light source installed within the carrier outboard of the lower surface portion of the rail member with a diffuser/filter is installed in the carrier gap diffusing and filtering light passing through the carrier gap with the carrier gap being vertically lower that the main gap such that when the light source is illuminated, light emitted through the carrier gap and through the diffuser/filter is upwardly extending light that further shines through the main gap upward toward the lower surface portion of the rail member.

2. The vehicle interior lighting assembly according to claim 1, further comprising:

the carrier at least partially defines a light source receiving structure that is installed directly to the lower surface portion.

3. The vehicle interior lighting assembly according to claim 2, wherein
the carrier is made of an opaque material such that light from the light source does not pass through the carrier.

4. The vehicle interior lighting assembly according to claim 3, wherein
the carrier is shaped and dimensioned such that light from the light source is directed to shine through the carrier gap and through the main gap.

5. The vehicle interior lighting assembly according to claim 2, wherein
the lower surface portion of the rail member includes at least two non-parallel surfaces adjacent to one another, and
the carrier includes at least two non-parallel surfaces shaped and dimensioned to mate with the at least two non-parallel surfaces of the lower surface portion of the vehicle roof structure with one of the at least two non-parallel surfaces of the carrier being fixed to a corresponding one of at least two non-parallel surfaces of the lower surface portion of the vehicle roof structure.

6. The vehicle interior lighting assembly according to claim 2, wherein
the carrier is fixed within a groove defined along the lower surface portion of the vehicle roof structure, the carrier being a straight elongated member that extends along the groove of the lower surface portion.

7. The vehicle interior lighting assembly according to claim 1, wherein
the vehicle roof structure includes a sunroof structure fixedly attached thereto such that a transparent area of the sunroof structure is located above the central opening of the headliner, and the lower surface portion is defined along an underside of a rail member of the sunroof structure.

8. The vehicle interior lighting assembly according to claim 7, wherein
the rail member includes an upper surface that defines a track, with an edge of a screen of the sunroof structure being slidably installed on the upper surface of the track.

9. A vehicle interior lighting assembly, comprising:
a vehicle roof structure having an outer periphery and a rail member fixed to the vehicle roof structure, the rail member defining a lower surface portion;
a headliner supported to the outer periphery of vehicle roof structure, the headliner having a central opening defined by an inner edge portion of the headliner, the opening exposing a portion of the vehicle roof structure, the inner edge portion of the headliner being spaced apart from the lower surface portion of the rail member such that a main gap is defined between the lower surface portion and inner edge portion of the headliner;
carrier defining a light source receiving structure attached to the rail member outboard of the lower surface portion, a light source installed within the carrier, the carrier defining a carrier gap between inboard ends of surfaces of the carrier with a diffuser/filter is installed in the carrier gap diffusing and filtering light passing through the carrier gap with the carrier gap being vertically lower than the main gap such that when the light source is illuminated light emitted through the carrier gap is upwardly extending light that further shines through the main gap upwardly toward the lower surface portion of the rail member.

10. The vehicle interior lighting assembly according to claim 9, wherein
the lower surface portion of the rail member defines a straight elongated groove with the carrier being fixed within the groove, the carrier being a straight elongated member that extends along the groove of the lower surface portion.

11. The vehicle interior lighting assembly according to claim 9, wherein
the carrier is made of an opaque material such that light from the light source does not pass through the carrier.

12. The vehicle interior lighting assembly according to claim 9, wherein
the carrier is shaped and dimensioned such that light from the light source is directed to shine through the main gap.

13. The vehicle interior lighting assembly according to claim 9, wherein
the lower surface portion of the vehicle roof structure includes at least two non-parallel surfaces adjacent to one another, and
the carrier includes at least two non-parallel surfaces shaped and dimensioned to mate with the at least two non-parallel surfaces of the lower surface portion of the rail member with one of the at least two non-parallel surfaces of the housing member being fixed to a corresponding one of at least two non-parallel surfaces of the lower surface portion of the rail member.

14. The vehicle interior lighting assembly according to claim 9, wherein
the vehicle roof structure includes a sunroof structure fixedly attached thereto such that a transparent area of the sunroof structure is located above the central opening of the headliner, and the rail member defines a track of the sunroof structure.

15. A vehicle interior lighting assembly, comprising:
a vehicle roof structure having an outer periphery and a sunroof structure fixedly attached to the vehicle roof structure spaced apart from the outer periphery, the sunroof structure having a rail member at a location spaced apart from the outer periphery, the rail member defining a lower surface portion;
a headliner supported to the outer periphery of vehicle roof structure, the headliner having a central opening defined by an inner edge portion of the headliner, the central opening exposing a transparent area of the sunroof structure, the inner edge portion of the headliner being spaced apart from the lower surface portion of the rail member such that a main gap is defined between the sunroof structure and inner edge portion of the headliner;
a carrier defining a light source receiving structure attached to the rail member outboard of the lower surface portion, a light source installed within the carrier, the carrier defining a carrier gap between inboard ends of surfaces of the carrier with a diffuser/filter is installed in the carrier gap diffusing and filtering light passing through the carrier gap with the carrier gap being vertically lower than the main gap the carrier being installed to the lower surface portion of the rail member such that when the light source is illuminated light emitted through the carrier gap and the diffuser/filter is upwardly extending light that further shines through the main gap upwardly toward the lower surface portion of the rail member.

16. The vehicle interior lighting assembly according to claim 15, wherein
the lower surface portion of the rail member of the sunroof structure has a straight elongated groove defined thereon with the housing member being fixed within the groove, the carrier being a straight elongated member.

17. The vehicle interior lighting assembly according to claim 15, wherein
the rail member includes an upper surface that defines a track, with an edge of a screen of the sunroof structure being slidably installed on the upper surface of the track.

18. The vehicle interior lighting assembly according to claim 15, wherein
the carrier is made of an opaque material such that light from the light source does not pass through the carrier.

19. The vehicle interior lighting assembly according to claim 15, wherein
the carrier is shaped and dimensioned such that light from the light source is directed to shine upwardly through the carrier gap and through the main gap.

20. The vehicle interior lighting assembly according to claim 15, wherein
the lower surface portion of the rail member of the sunroof structure includes at least two non-parallel surfaces adjacent to one another that define a groove, and
the carrier includes at least two non-parallel surfaces shaped and dimensioned to mate with the at least two non-parallel surfaces of the lower surface portion of the sunroof structure with one of the at least two non-parallel surfaces of the carrier being fixed to a corresponding one of at least two non-parallel surfaces of the lower surface portion of the sunroof structure within the groove.

* * * * *